March 24, 1936.   A. G. A. NILSSON ET AL   2,034,988
POWER TRANSMISSION
Filed March 1, 1934   2 Sheets-Sheet 1
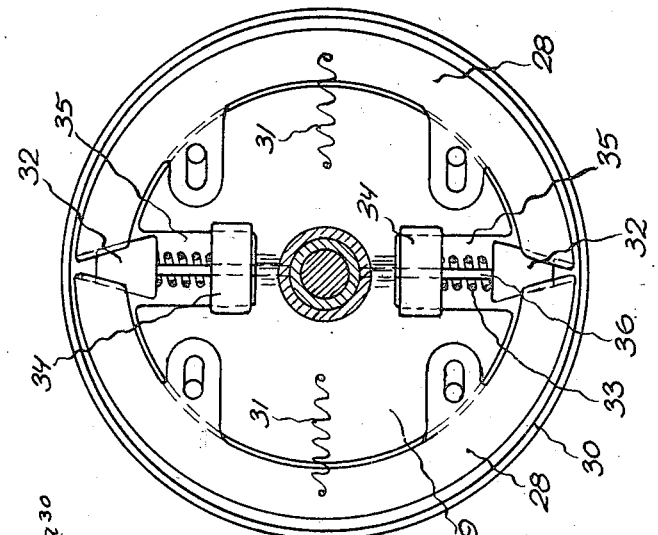
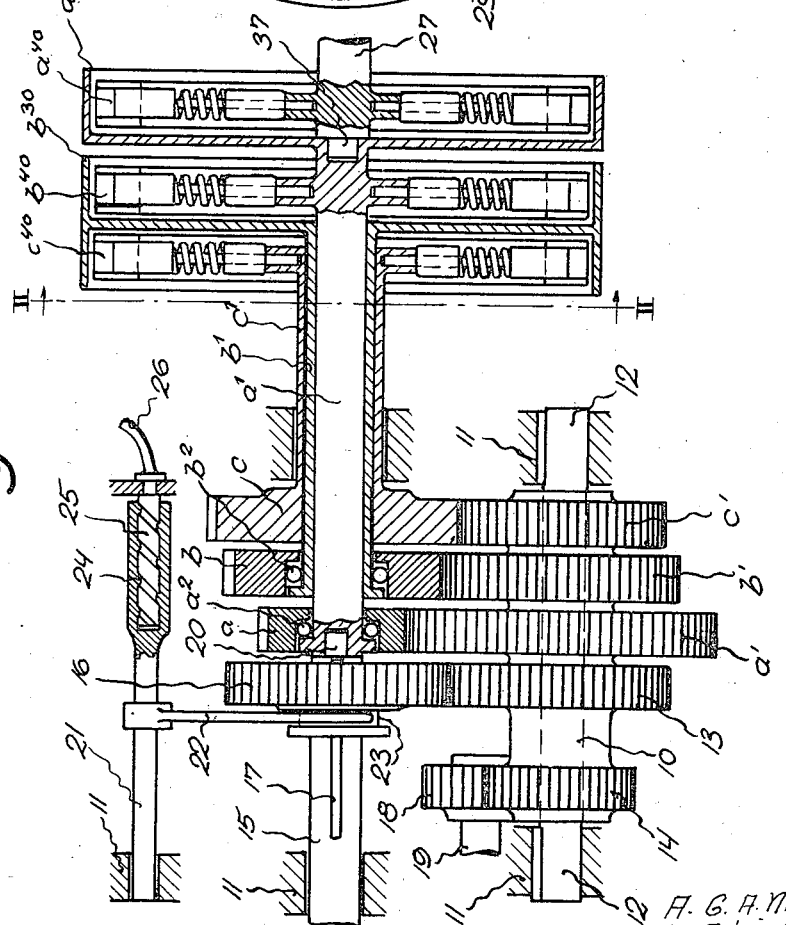
A. G. A. Nilsson
H. E. Lindberg
INVENTORS
By Marks & Clerk
ATTYS.

March 24, 1936.  A. G. A. NILSSON ET AL  2,034,988

POWER TRANSMISSION

Filed March 1, 1934   2 Sheets-Sheet 2

A. G. A. Nilsson
H. E. Lindberg
INVENTORS

By: Marks & Clerk
ATTys.

Patented Mar. 24, 1936

2,034,988

UNITED STATES PATENT OFFICE 2,034,988

POWER TRANSMISSION

Alex Gustav Allan Nilsson and Henry Edvin Lindberg, Malmo, Sweden

Application March 1, 1934, Serial No. 713,584
In Sweden September 22, 1933

2 Claims. (Cl. 74—336)

The present invention relates to power transmission means having two or more stages or gears in which the gear wheels are permanently intermeshing, and which are adapted to be put into or held out of action automatically depending upon the variable number of rotation on a driving shaft. One object of the invention is to provide a simple construction of transmission means of the type referred to permitting uniform and noiseless engagement of the different stages of the transmission. A further object of the invention is to provide means for engaging or disengaging said stages manually if desired, so that any desired stage can be chosen at any moment.

One feature of the invention is such provision of the gears that in each pair of gear wheels one is connected to one part of a centrifugal clutch so as to run with said part at least when rotating in one direction. By using centrifugal clutches for engaging or disengaging the gears an entirely automatical control of the different gears may be obtained, and further the invention involves the advantage of permitting omission of a clutch for disconnecting the transmission means from the motor at the change from one gear ratio to another. This advantage might be of particular advantage in the application of the invention to gear boxes of road and railway vehicles such as automobiles and the like because hereby the construction of the transmission means as a whole will be simplified and the control of the vehicle will be reduced substantially to braking and/or steering.

Another advantage of the device according to our invention is involved in the fact that the gear box and the clutches associated therewith may readily be collected into one single unit of relatively small dimensions requiring little space.

Other features and advantages of the invention will be made clearer from the following description in which embodiments of the invention applied to a gear box for automobiles having three forward speeds and also back speeds will be described in conjunction with the accompanying drawings, in which Figure 1 is a longitudinal section showing diagrammatically one embodiment of the gear box, and Figure 2 is a transverse section along the line II—II of Fig. 1.

Figure 3:
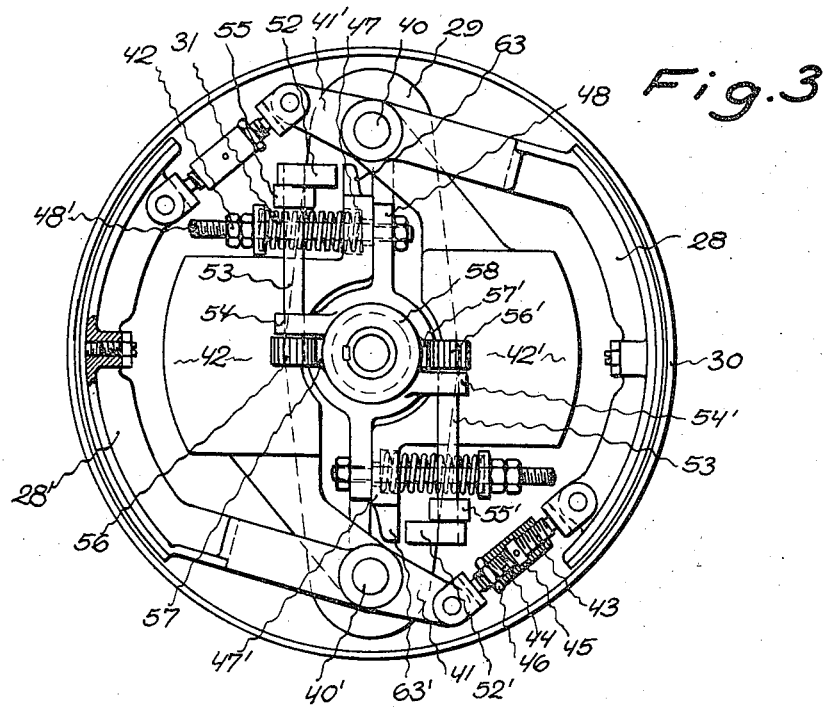
Figure 4:
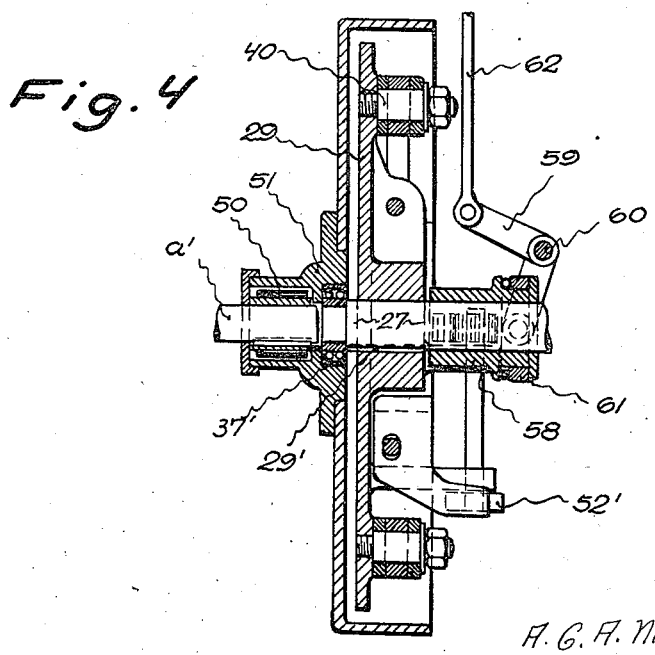

Figure 3 shows more in detail a vertical elevation of the clutch for the lowest stage of the gear box according to a modification including means for operating the clutch manually, and Figure 4 is a longitudinal section through the construction shown in Figure 3.

Referring to Figures 1 and 2 in the drawings, the gear wheels $a$ and $a'$ of the first or lowest gear mesh with each other permanently. The gear wheel $a$ is rotatably mounted on a shaft $a^1$ and adapted to be driven therefrom by way of a free wheel clutch $a^2$ mounted in the gear wheel. In a similar way the gear wheel $b$ of the pair of gears $b$, $b'$ constituting the next or second stage is journaled on a hollow shaft $b^1$ concentrically mounted on the shaft $a^1$. The gear $b$ is driven from the shaft $b^1$ by way of a free wheel clutch $b^2$ mounted in same gear wheel and of a known type. More than three forward gears or speeds may of course be used, and in such case one gear wheel in all pairs, apart from that of the final gear, are journaled similarly on its own shaft and is driven by way of a free wheel or one way clutch. The gear wheels of the final or—in the embodiment shown—third gear are designated with $c$, $c'$, and the wheel $c$ is secured to or integral with its shaft $c^1$ which is hollow and rotatably mounted on the shaft $b^1$. From reason made clear in the following it is namely unnecessary for the function of the device to connect the gear wheel $c$ of the final stage to its shaft by way of a free wheel clutch but, if desired, a clutch of said kind may be mounted in this gear wheel.

The gears $a'$, $b'$, $c'$ are fixed together by a common hub or sleeve 10 rotatably mounted on the counter shaft 12 which may be wedged to the casing 11 of the gear box. Further two gear wheels 13 and 14 are also fixed to the hub or sleeve 10. By way of the gear wheel 13 which is positioned adjacent to the gear wheel $a'$ of the lowest speed, the movement of the different speeds is transferred to the driven or output shaft 15 of the gear box by way of a sliding or striking gear wheel 16 splined on said shaft as shown by 17. The sliding wheel 16 may be disengaged from the gear 13 and brought into engagement with a gear wheel 18 driven by the gear wheel 14 and meshing permanently with said wheel 14. The gear wheel 18 is loosely mounted on a lay shaft 19. It will be found that since the hub 10 and all gear wheels fixed thereto always rotate in the same direction the output shaft 15 will have one direction of rotation when the sliding wheel 16 meshes with the gear wheel 13 secured to the hub 10, and will have an opposite or reversed direction of rotation when the sliding wheel 16 meshes with the wheel 18. Further, since the movements of all gear wheels are transmitted to the output shaft by way of the counter-shaft wheels fixed in relation to each other and to the hub 10, it will be seen that the movements of all gears may be transmitted to the output shaft of the gear box in its forward as well as in its backward run.

The output or driven shaft 15 is suitably concentric to the connecting shafts $a^1$, $b^1$, and $c^1$ of the different gears and is located in the alignment of the shaft $a^1$ in the end of which it is rotatably journaled in a suitable manner as for instance by spigoting as shown at 20.

The sliding gear wheel 16 for the reverse run may be controlled by any suitable means as for instance means comprising a forked member 22 secured to a sliding rod 21 which member engages a circumferential groove at the lateral surface of the gear wheel. The sliding rod may be operated by any suitable means known per se. For instance, one end thereof may be formed as shown to a sleeve 24 having inside threads which are engaged by a rotatable but not slidable screw 25. The screw may be coupled to a suitable operating member as a handle (not shown) by way of a rotatable flexible cable or wire 26. Instead of the sleeve a plunger may be connected to the sliding rod 21, and said plunge may be caused to move by the action of a fluidum under pressure or the vacuum in the gas inlet passage of the automobile or the like.

The concentric shaft $a^1$, $b^1$, and $c^1$ carrying the gear wheels $a$, $b$, and $c$ are individually connected to the driven portion of a centrifugal clutch. The expression centrifugal clutch is adapted to indicate, in this connection, a clutch which is adapted to be engaged by action of the centrifugal force at a predetermined number of revolutions of those members of the clutch which are operated by means of the centrifugal force. In the lowest gear clutch, the members operated by the centrifugal force are mounted on the input shaft driving the transmission means as a whole; in the clutch associated to the next or second gear or speed, the corresponding members are mounted to the shaft $a^1$ driven by the last mentioned gear; in case of more than three gears or speeds, the corresponding clutch members of the next or third gear or speed are mounted on the shaft $b^1$ of the second gear and so on. On the other hand, the centrifugal members of the top gear may be mounted on the connecting shaft $c^1$ interpositioned between the top gear $c$, $c'$ and the clutch subordinated thereto, as shown in the drawings.

In the construction shown in Figures 1 and 2 of the drawings each clutch includes two clutch shoes which are mounted on and guided radially by a disc 29 so as to be permitted to engage an outer drum 30 and coupled to same. The shoes are connected to the disc 29 by means of returning springs 31. Between the opposite ends of the clutch shoes which ends are inclined oppositely in relation to the radius of the drum, wedges 32 are provided, such wedges being engaged by springs 33 which, in turn, are actuated by movable inertia members 34. The inertia members may be formed as blocks and are guided by radially extending slots 35 provided in the disc 29. Each wedge is guided by a rod 36 passing through the block one end of which rod extends slidably into a radial bore provided in the hub of the disc 29. The inertia members $a^{34}$, $b^{34}$, $c^{34}$ of the clutches designated generally by $a^{40}$, $b^{40}$, $c^{40}$ are dimensioned in such a manner that the clutches will be engaged, viz., the pressure of the inertia members 34 transmitted by the springs 35 will exceed the reacting spring pressure of the returning springs 31 resulting in sufficient friction pressure between the shoes and the drum, at suitable revolutions of the driving or the driven parts of the clutches respectively.

The centrifugal clutches shown in Figures 1 and 2 are adapted to illustrate the principle of clutches suitable in the transmission means according to the invention, but the invention is not limited thereto. Other clutch constructions may be used permitting engaging and disengaging at suitable revolutions. For instance, powder clutches and the like may be used. Further, the clutches may be constructed as shown in Figures 3 and 4 in which same reference characters are used to indicate similar parts to those shown in Figures 1 and 2.

One of the clutches, viz., that of the top gear is shown in Figures 3 and 4; it is to be noted, however, the remaining clutches may be constructed in a similar way. Though any suitable number of clutch shoes may be performed, the clutch has preferably two shoes 28, 28' journaled at one end in diametrically opposite positions in the drum 30 on pivots 40 and 40' respectively secured to the disc 29 which is carried by and keyed to the driven shaft 27 as shown at 29'. The other end of the shoe 28 is coupled by means of a link to one end of a lever 41 mounted on the pivot 40' carrying the other shoe 28'. Secured to the other end of said lever 41 is an inertia member 42. Correspondingly the shoe 28' is connected to a lever 41' mounted on the pivot 40 and carrying an inertia member 42'.

The links connecting the shoes and the levers carrying the inertia members may be constructed as adjusting devices comprising two oppositely threaded screws 43 and 44 connected to the shoe and the lever respectively and surrounding sleeve 45 having corresponding inside threads. By turning the sleeve 45 the space between the brake shoes and the inner surface of the drum may be adjusted. The sleeve may be keyed to the screw 44 by means of a nut 46.

Each inertia member has integral therewith a projection 47 adapted to be forced against an abutment 48 secured to or integral with the disc 29 and the hub thereof, by means of the returning spring 31 which is held in position by a bolt $48^1$ carried by the abutment 48 as shown in Figure 3. The force of the spring 31 may be varied by adjusting nuts 49 or the like.

In operation, when the speed of the driving shaft and of the parts rotating therewith reaches such a value that the centrifugal force set up in the inertia members is sufficient to overcome the action of the returning springs such members will move outwardly so that the clutch shoes will be forced by way of the levers 41 and 41' and the links connected thereto against drum 30 into frictional contact therewith causing the drum to rotate with the shoes. The movement of the drum 30 will be transmitted to the shaft $a^1$ by way of a free wheel clutch 50 mounted in the hub 51 of the drum, and further to the lowest gear in the gear box.

The arrangement of all clutches in relation to each other will be more clearly understood from Figures 1 and 2. The disc 29 carrying the inertia members in the clutch associated with the lowest gear is secured to the input or driving shaft 27 which is spigoted as shown by 37 into the end of the shaft $a^1$ connected to the lowest gear. A roll bearing 37' may also be used in the connection between the driving shaft 27 and the shaft $a^1$ as shown in Figure 4. Secured to that end of the shaft $a^1$ which is opposite to the shaft 27 is the other or driven portion of the clutch $a^{40}$ which portion consists of the drum $a^{30}$. The shaft $a^1$ carries in turn the disc guiding the inertia members of the clutch $b^{40}$ the corresponding clutch drum $b^{30}$ being secured to the end of the shaft $b^1$ associated with the second gear. On the other hand, the top or third gear has not the disc carrying the inertia members (the blocks 34 for instance) located on the shaft ($b^1$) of the previous gear but on the shaft $c^1$ of the third gear the clutch drum being secured to the shaft of the previous gear, viz., on the shaft $b^1$. The drum of the clutches associated with the third and with the second gear may in such case be common to both of said clutches, and may be formed for instance as shown in the drawings in which it comprises two oppositely projecting cylindrical flanges the inner surface of which are adapted to be engaged by the shoes of both clutches.

The transmission means described above operates as follows: When the speed of the input or driving shaft 27 increases, progressively, after starting said shaft, the clutch $a^{40}$ of the lowest will be engaged at a certain relatively low speed the movable inertia members thereof being suited to force the clutch shoes into contact with the drum $a^{30}$ at same speed. Thereby the shaft $a^1$ will be caused to rotate, driving by way of the free wheel clutch the gear wheel $a$ which in turn rotates the gear wheel $a'$ so that all gear wheels located on the lay shaft will rotate simultaneously. Consequently, the gears $b$ and $c$ of the remaining gears will rotate. The free wheel clutch $b^2$ mounted in the gear wheel $b$ is constructed so as to permit said gear wheel at this moment to run freely around the shaft $b^1$. Since the gear wheel $c$ is fixed to its shaft $c^1$, said shaft will be rotated. So long as the clutch $a^{40}$ is engaged only, the power is put out by way of the shaft $a^1$, the pair of gear wheels $a$, $a'$, the gear wheel 13 and the sliding wheel 16 and the output shaft. The remaining clutches then run idle.

When the speed increases to a certain suitable higher value so that the centrifugal force set up in the movable inertia members in the clutch $b^{40}$ is sufficient to engage said clutch, the drum $b^{30}$ will be rotated by the shoes of the clutch $b^{40}$. The speed of said drum $b^{30}$ was previously so much lower than that of the shoes of same clutch as determined by the gear ratio of the gear wheels $a$, $a'$ and $b$, $b'$. After engaging the clutch $b^{40}$ associated to the second gear, the drum of said clutch $b^{40}$ and, consequently, the shaft $b^1$ will obtain the same speed as that of the input shaft 27, and as the shaft $a^1$. The output shaft is now driven by way of the gear $b$, $b'$ and the gear wheels 13, 16 which are provided to be still in engagement. On the engagement of the clutch $a^{40}$ and when the shafts $a^1$ and $b^1$ obtain identical speed, the speed of the gear wheel $a$ in the lowest gear will be increased due to the step up gears $b$, $b'$ and $a$, $a'$ so that it will be higher than the speed of the shaft $a^1$ and, consequently, the gear wheel $a$ runs freely around its shaft which is permitted by the free wheel clutch $a^2$.

On further increase of the speed to a suitable extent, the clutch $c^{40}$ associated to the third and, in the present case, the top gear will be engaged whereas the gear wheel $a$ as well as the gear wheel $b$ run freely on their shafts $a^1$ and $b^1$ respectively, the power being transmitted from the shaft $c^1$ by way of the pair of gears wheels $c$, $c'$, the sleeve on the counter-shaft and the pair of gear wheels 13, 16 to the driven or output shaft 15 of the gear box.

When reversing the output movement, the sliding wheel 16 is engaged with the gear wheel 18 and all movements are put out via the gear wheel 14 instead of the gear wheel 13 but, for the rest, the operation will be identical to that described above. It is to be noted that there is a possibility always to choose the gear ratio of the pair of wheels 14, 18 of the reversing gear in such a manner that all or any desired gear or stage of the transmission means may be utilized for the backward run. In other words, said gear ratio may be chosen so as to obtain a speed in the centrifugal clutches sufficiently high to permit the most suitable gears to be engaged during the backward run in spite of the relatively low output speed needed therefor.

From the above it will be seen that the different gears or stages of the power transmission means are caused to function automatically. In certain cases, however, it may be suitable to have the possibility of controlling the transmission means manually. For that purpose a controlling device of the type shown in Figures 3 and 4 in conjunction with the clutch of the lowest gear may be used.

The controlling device consists of cans adapted to co-operate with the inertia members so as to prevent them from turning outwards or allow them to do it at will. Each cam 52, 52' is secured to one end of a spindle 53, 53' carried on the disc 29 by means of consoles 54, 55 and 54', 55' respectively as shown in Figure 3, and fixed to the other end of the spindles 53, 53' are pinions 56, 56' which mesh with racks 57, 57' provided at opposite sides of a sleeve 58 splined to the driving shaft 27. The sleeve 58 is adapted to be moved longitudinally on the shaft 27 by a suitable operating mechanism comprising for example a bell crank 59 rotatably mounted on a fixed pivot 60 and having one end connected to an annulus 61 guided in a circumferential groove in the sleeve 58 and the other end connected to an operating rod 62 as suggested in Figure 4. In the positions shown in the drawings, each cam 52, 52' have its top directed towards abutments 63, 63' extending outwardly from the projections 47, 47' of the inertia members 42, 42' respectively so that said members are prevented from turning outwards. When moving the operating rod 62 downwards in Figure 4, the sleeve 58 will be displaced to the right turning the cams out of their locking position, so that their top will be directed at right angles to their former position whereby the inertia members are permitted to turn outwards and the clutch shoes to engage the drum. It will be understood herefrom that the clutch may be engaged and disengaged at any moment at will of the operator.

Similar cam devices to that described in connection with the lowest gear clutch may be obtained for the remaining clutches and the cam devices of the separate clutches may be coupled together so as to be operated by one single operating member by any suitable means.

What we claim as our invention is:

1. A combined clutch and transmission comprising a drive shaft, a driven shaft, an intermediate shaft between and aligned with the driving and driven shafts, the said driven shaft being piloted in said intermediate shaft, the said intermediate shaft having a plurality of concentric sleeves rotatably mounted thereon, clutches connecting said driving and intermediate shafts, the intermediate shaft with one of said sleeves, and at least two of said sleeves, a gear mounted on each of said sleeves and adjacent one end of said intermediate shaft, the gear mounted on the outermost of said sleeves being permanently connected thereto and the gears mounted on the innermost of said sleeves and the intermediate shaft being connected thereto by overrunning clutches, a gear slidably mounted on the driven shaft adjacent the gear on the intermediate shaft, a lay shaft, a gear rotatably mounted on said lay shaft, a countershaft, a compound gear mounted on said countershaft having teeth meshing with all of the gears on said sleeves, intermediate shaft, lay shaft and driven shaft, means for causing said clutches to automatically engage in accordance with the speed or rotation of the driving shaft whereby a plurality of gear ratios may successively be established, and an instrumentality for shifting the gear on the driven shaft into mesh with the gear on the lay shaft to thereby establish reverse drive.

2. A combined clutch and transmission comprising a drive shaft, a driven shaft, an intermediate shaft between and aligned with the driving and driven shafts, the said driven shaft being piloted in said intermediate shaft, the said intermediate shaft having a plurality of concentric sleeves rotatably mounted thereon, clutches connecting said driving and intermediate shafts, the intermediate shaft with one of said sleeves, and at least two of said sleeves, a gear mounted on each of said sleeves and adjacent one end of said intermediate shaft, the gear mounted on the outermost of said sleeves being permanently connected thereto and the gears mounted on the innermost of said sleeves and the intermediate shaft being connected thereto by overrunning clutches, a gear slidably mounted on the driven shaft adjacent the gear on the intermediate shaft, a lay shaft, a gear rotatably mounted on said lay shaft, a countershaft, a compound gear mounted on said countershaft having teeth meshing with all of the gears on said sleeves, intermediate shaft, lay shaft and driven shaft, means for causing said clutches to engage whereby a plurality of gear ratios may successively be established, and an instrumentality for shifting the gear on the driven shaft into mesh with the gear on the lay shaft to thereby establish reverse drive.

ALEX GUSTAV ALLAN NILSSON.
HENRY EDVIN LINDBERG.